United States Patent [19]

Litt

[11] 3,987,954
[45] Oct. 26, 1976

[54] SOLDER REMOVAL DEVICE

[75] Inventor: Kenneth C. Litt, Silver Spring, Md.

[73] Assignee: Pace Incorporated, Silver Spring, Md.

[22] Filed: Oct. 10, 1975

[21] Appl. No.: 621,576

[52] U.S. Cl. .................................................. 228/20
[51] Int. Cl.² .......................................... B23K 3/00
[58] Field of Search .................... 228/19, 20, 52, 57, 228/191, 264

[56] References Cited
UNITED STATES PATENTS

| | | | |
|---|---|---|---|
| 3,561,662 | 2/1971 | Duhaime et al. | 228/20 |
| 3,578,948 | 5/1971 | Friend et al. | 228/20 X |

Primary Examiner—Al Lawrence Smith
Assistant Examiner—Margaret Joyce
Attorney, Agent, or Firm—Gerald J. Ferguson, Jr.; Joseph J. Baker

[57] ABSTRACT

A solder removal device has air under pressure supplied thereto. The device has a hollow handle in which is disposed a Venturi structure for creating a vacuum where the vacuum is applied through a solder collection chamber also disposed in the handle and a solder extraction tube in communication with the solder collection chamber and extending outside of the handle. The air discharged from the Venturi structure is directed around the solder collection chamber and out an opening in the handle whereby heat is removed from the solder collection chamber, the heat having been generated by hot air and solder sucked into the chamber. Hence, the device may be used continuously for solder extraction without discomfort to the operator's hand.

A rotatable cover is also provided in the handle for either partially or completely blocking the air discharged from the Venturi structure whereby air is blown outwardly through the suction tube so that a hot air jet suitable for melting solder is effected when the discharge air is partially blocked and a high intensity jet is effected suitable for blowing away loose solder or the like when the discharge air is completely blocked. A trigger is optionally provided on the handle. The trigger actuates valve means disposed within the device so that upon actuation thereof, the air under pressure supplied to the device is applied to the Venturi structure.

7 Claims, 7 Drawing Figures

SOLDER REMOVAL DEVICE

BACKGROUND AND SUMMARY OF THE INVENTION

This invention is directed to solder removal devices and the like.

There are known solder removal devices wherein a solder collection chamber is disposed within the handle suitable for receiving extracted molten solder and the like. However, in these devices, there is a tendency for the handle to be heated to a temperature level which makes it quite difficult for the operator to hold the handle if the device is to be used continuously for solder removal. That is, the hot air and solder which is sucked into the solder collection chamber raises the temperature thereof and thus the surrounding handle also has its temperature raised.

It is thus a primary object of this invention to provide an improved solder removal device having a solder collection chamber incorporated therein and means for maintaining the temperature of the handle of the device at a temperature level so that an operator can comfortably employ the device for an extended period of time.

It is usually necessary to melt the solder at an electrical connection before it can be removed. A particularly efficient way for effecting the desired melting is to direct a hot air jet on the solder to be melted. Further, it is quite often desirable to have the capability of blowing away loose bits of solder rather than sucking them into the solder removal device.

It is thus a further important object of this invention to provide an improved solder removal device which may be employed in one of three different modes of operation — that is, a vacuum mode wherein molten solder or the like is sucked into the device, a hot air jet mode wherein relatively low velocity, hot air is directed onto solder to be melted preparatory to the removal thereof or a high intensity jet mode where a high intensity jet of air can be directed onto loose bits of solder for the blowing away thereof.

Another desirable feature of solder removal devices is the capability of immediately applying a vacuum or air jet to a predetermined area. Heretofore, the vacuum or air under pressure is generated and valved at a point remote from the solder removal device. Thus, for example, a foot operated valve structure may be employed to gate air under pressure to the solder removal device. However, since the air under pressure tends to undergo a decrease along the length of the connection between the foot operated valve structure and the solder removal device, this arrangement is undesirable in certain applications. Further, delay will be experienced in establishing a vacuum in the solder removal device depending, once again on the length of the connection thereto from the external valving device.

It is thus a further object of this invention to provide an improved solder removal device having valving means incorporated within the device and trigger means disposed thereon for actuating the valving means when desired to thereby immediately establish a high level vacuum within the device.

Other objects and advantages of this invention will be apparent from a reading of the following specification and claims taken with the drawing.

DETAILED DESCRIPTION OF THE PREFERRED EMBODIMENT

Figure 1:
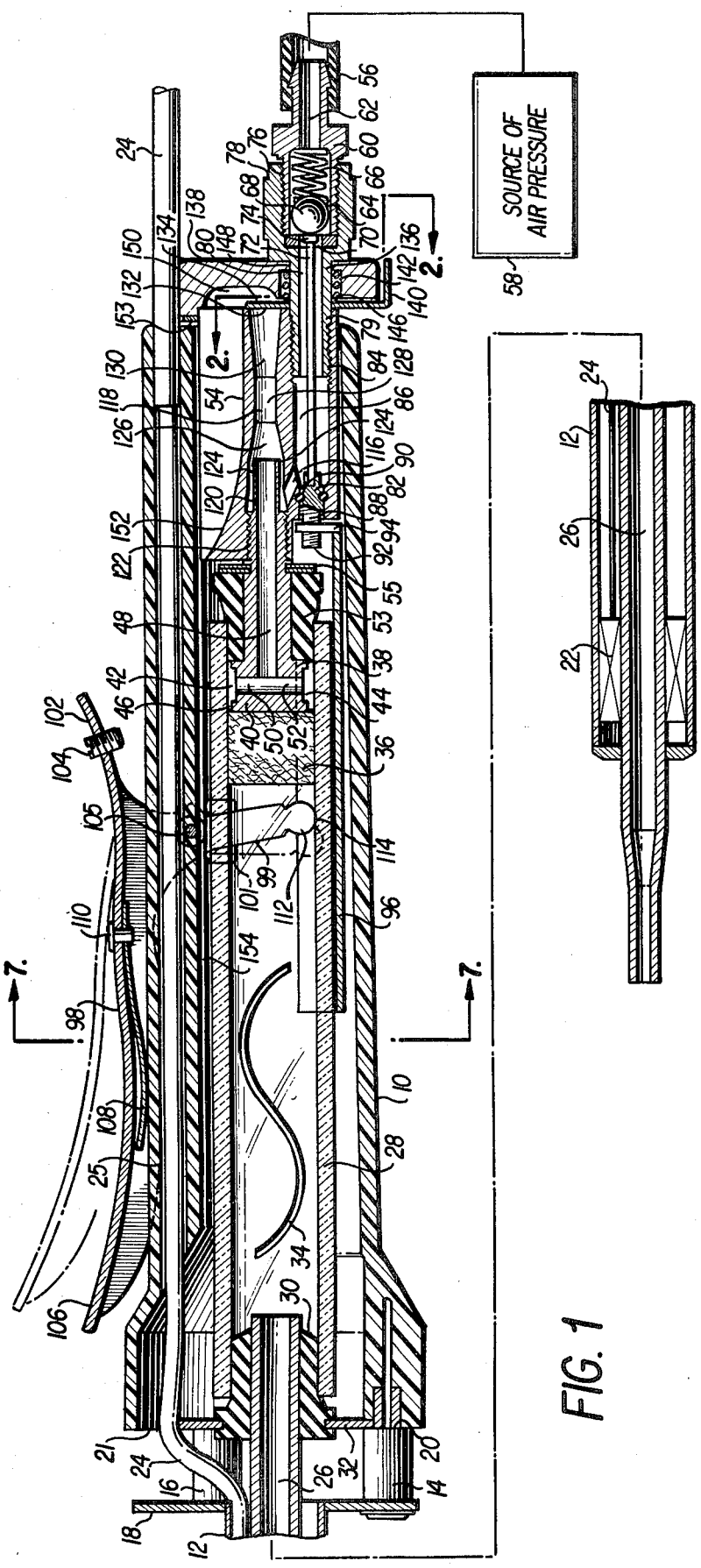
FIG. 1 is a cross-sectional elevation of a solder removal device in accordance with the invention.

Reference should now be made to FIGS. 1-7 where like reference numerals refer to like parts. The device of this invention includes a generally cylindrical handle 10 molded from plastic or the like. Attached to the front end of the handle is a cylindrical, tubular tip 12 having a rearward, circular flange 18. The tip is mounted with respect to the handle by means including spacers, two of which are shown at 14 and 16. The spacers are disposed between the circular flange 18 and the front portion of the handle as indicated at 20 whereby a substantially annular opening 21 is established at the front of the handle. Disposed within tip 12 is a heating element 22 connected to a wire 24, which extends through a passageway 25 in the upper portion of handle 10 to a source of electric power (not shown). Also disposed within tip 12 is a tube 26 through which solder may be sucked into a cylindrical, solder collection chamber 28.

The collection chamber 28 is disposed within handle 10, the forward end of the chamber being mounted at the forward end of the handle 10 on an annular rubber seal 30, which is disposed about tube 26 and connected to an annular plate 32 mounted at the front end of handle 10. An S-shaped baffle 34 may be provided in chamber 28 to deflect solder as it is ejected from tube 26.

Disposed within the rear end of collection chamber 28 is a cylindrical, air-porous filter 36 and a generally cylindrical structure 38 through which vacuum is applied to tube 26 through chamber 28. The structure 38 includes a circular, forward deflecting plate 40 and a pair of radially disposed openings 42 and 44 through which vacuum is applied. As can be appreciated in FIG. 1, a small annular passageway for the vacuum is provided around plate 40 at 46 since the diameter of forward deflecting plate 40 is slightly less than the internal diameter of chamber 28, plate 40 being approximately concentrically mounted within chamber 28. A passageway 48 for the vacuum is connected to openings 42 and 44 by passageways 50 and 52 respectively. An annular rubber seal 53 is mounted on structure 38, the rear end of chamber 28 being mounted thereon. Retaining rings indicated at 55 may be employed to maintain seal 53 in position.

The foregoing structure is generally known and substantially described in U.S. Pat. No. 3,392,897 granted to William J. Siegel, this patent being incorporated herein by reference. Although the structure described heretofore has been described in terms of the application of a vacuum to tube 26, means including the structure indicated at 54 will now be described whereby not only a vacuum can be applied to tube 26 but also a hot air jet can be applied for melting solder or the like preparatory to removal thereof or a high intensity jet can be applied for blowing away loose solder or the like.

A tubular hose 56 is connected to a source 58 of air under pressure. The hose 56 is connected at its other end to a generally cylindrical fitting 60 having a circular passageway 62 extending therethrough into a cylindrical chamber 64. Disposed within chamber 64 is a compression spring 66 and a ball valve 68. A circular opening 70 into chamber 64 is provided at the other end of fitting 60. Compression spring 66 normally pushes ball 68 against opening 70 to prevent the flow of air therethrough. Fitting 60 is threaded on an outer portion thereof at 76 into a generally cylindrical valve housing 78. Housing 78 includes a forward extension 79 having a circular passageway 80 extending therethrough. Passageway 80 communicates with opening 70 of fitting 60.

Disposed against the other side of ball 68 is a circular plate 74 connected to a rod 72. Rod 72 extends through passageway 80 and is connected at its other end to a generally cylindrical valve adjusting member 82. Valve housing 78 is threaded at its forward end 84 into the lower portion of structure 54 so that passageway 80 of fitting 78 communicates with a circular passageway 86 extending through the lower portion of structure 54. The valve adjust member 82 is slidably disposed within an opening 88 in the lower, forward portion of structure 54. An O-ring 90 is disposed about member 82 to prevent the passage of air through opening 88. Member 82 is threaded at the forward portion 92 thereof. A non-symmetrical nut 94 is threaded onto portion 92. A curved trigger member 96 engages nut 94 at the lower extremity thereof. Curved trigger member 96 is connected to a trigger 98 disposed on the outer portion of handle 10. By depressing trigger 98 to the solid line position shown in FIG. 1, ball valve 68 is opened to allow the flow of air into opening 86 of structure 54 in a manner which will be described in more detail hereinafter. Disposed about the rearward arm 102 of lever 98 is a member 104 which prevents undue forward movement of curved trigger member 96 when trigger 98 is in its unactuated position indicated by phantom lines in FIG. 1. The forward arm 106 of lever 98 has a leaf spring 108 connected to the bottom thereof at 110. Spring 108 automatically returns the trigger to its raised, unactuated position upon release of pressure thereon.

Figure 7:
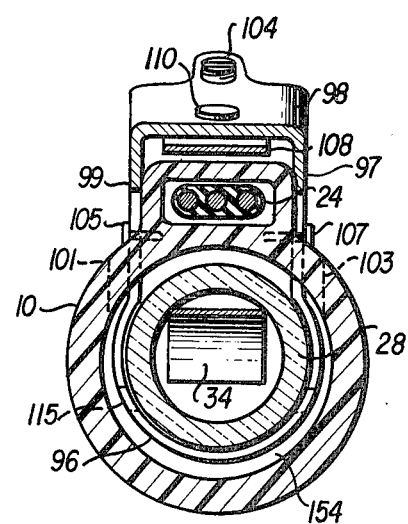

Referring to FIGS. 1 and 7, there is disposed at opposite sides of trigger 98 a pair of legs 97 and 99, one of which is shown at 99 in FIG. 1. A pair of openings 101 and 103 are disposed in the opposite sides of handle 10, one of which is shown in FIG. 1 at 101. The legs 97 and 99 are respectively pivotally connected to the opposite sides of handle 10 by a pair of screws 105 and 107, one of which is shown at 105 in FIG. 1. The legs 97 and 99 extend through the openings 101 and 103 to respectively connect to opposite sides of curved trigger member 96, the connection of leg 99 thereto being indicated at 115 in FIG. 7 where in FIG. 1 the circular bottom portion 112 of leg 99 so engages a correspondingly circular inset 114 of member 96 that portion 112 rotates within inset 114 upon depression of trigger 98. As portion 112 rotates within inset 114, curved trigger member 96 slides parallel to the outer portion of chamber 28, the curvature of member 96 causes nut 94 and rod 72 to also move rearwardly and thus ball 68 is pushed away from opening 70 to permit the application of air under pressure to passageway 86 whenever lever 98 is depressed.

This air is then applied to an opening 116 which communicates with a generally cylindrical passageway 118 extending through the upper portion of structure 54. In accordance with one important aspect of the invention, member 38 is provided with a rearwardly extending tubular portion 120, which extends into passageway 118. Tubular portion 120 is threaded on the outside thereof at 122 into the forward upper portion of structure 54. The outer diameter of tube 120 at the end thereof is slightly less than the internal diameter of passageway 118 so that a small annular opening exists at 124 whereby the air under pressure from opening 116 can pass through annular opening 124 into passageway 118.

Figure 2:
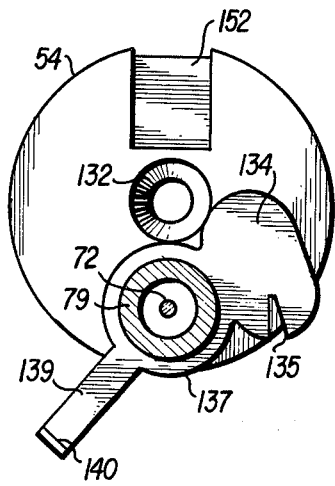
FIGS. 2-4 are cross-sectional views taken along the line 2—2 of FIG. 1, where FIG. 2 corresponds to the vacuum mode of operation, FIG. 3 the high intensity jet mode of operation and FIG. 4 the hot air jet mode.
Figure 3:
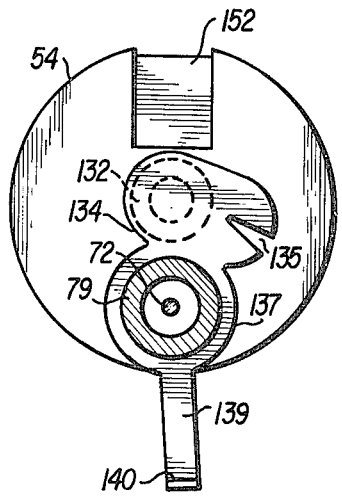
Figure 4:
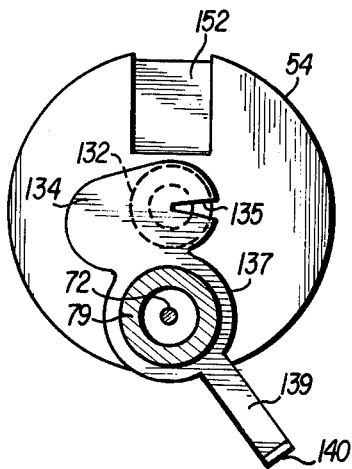

Passageway 118 is so formed that a forward portion 126 has a decreasing taper, a middle portion 128 is of a constant, relatively small diameter and a forward portion 130 thereof flares open as a nozzle. The air under pressure passing through annular opening 124 creates a vacuum in tube 120 (and thus tube 26) in accordance with the Venturi principle if allowed to pass through the open end 132 of passageway 118. Whether a vacuum is established in tube 120 depends on the position of a cover 134. This can best be seen in FIGS. 2–4. Cover 134 has a small inset 135 incorporated therein and an annular support portion 137 together with outwardly extending arm 139. Arm 139 has a rearwardly extending handle portion 140, as can be seen in FIG. 1. If the cover is positioned as shown in FIG. 2, air will freely flow through opening 132 whereby a vacuum will be created in tube 120. If cover 134 is positioned as shown in FIG. 3, opening 132 is completely blocked and a high intensity jet of air is established in tube 120 (and thus in tube 26) suitable for blowing away loose solder or the like. If cover 134 is positioned as shown in FIG. 4, opening 132 is only partially blocked since inset 135 extends over the opening. The size of the inset is such that air is blown out of tube 26, the velocity of the air in tube 26 being relatively slow so that it is heated by heater 22 to a temperature sufficient to melt solder preparatory to the removal thereof.

Figure 5:
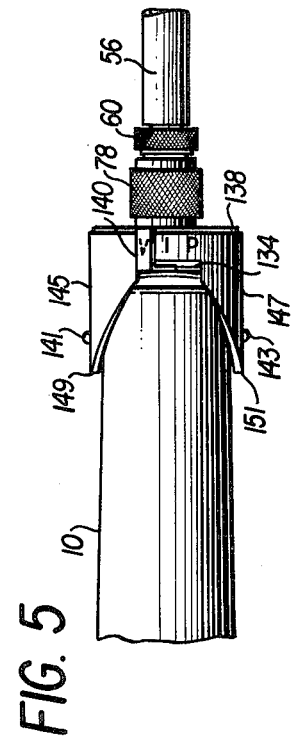
FIG. 5 is a partial bottom view of the rear portion of the solder removal device of this invention.

Cover 134 is rotatably mounted at annular support portion 137 on a circular portion 136 of forward extension 79 of valve housing 78. As indicated in FIG. 5, indicia are provided on an end cover 138 to indicate which mode of operation the device has been placed in by the operator. The vacuum mode is indicated by the letter V, shown in dotted lines under handle portion 140. This mode is also shown in FIG. 2. The high intensity jet mode is indicated by the letter I and the heated air jet mode is indicated by the letter P in FIG. 5. Thus, handle portion 140 is manually positioned over the desired indicia to place the device in the corresponding mode of operation.

Figure 6:
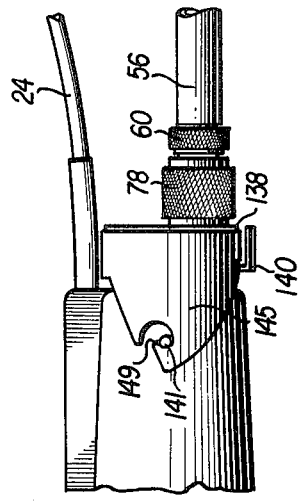
FIG. 6 is a partial side elevation of the rear portion of the solder removal device of this invention; and, FIG. 7 is a cross-sectional view taken along line 7—7 of FIG. 1.

Reference should be made to FIGS. 5 and 6 for a further illustration of end cover 138. As can be seen, handle 10 is provided with a pair of outwardly extending knobs 141 and 143 at the rearward portion thereof. The cover includes a pair of forwardly extending portions 145 and 147 having generally spiral shaped insets 149 and 151 for removably connecting the cover to knobs 141 and 143. An annular leaf spring indicated at 153 in FIG. 1 may be employed to keep knobs 141 and 143 disposed in insets 149 and 151 during disassembly of the device. Assembled cover 138 is held in place by valve housing 78, which is threaded into structure 54. As can be seen in FIG. 1, the cover 138 is provided with a circular passageway 142 through which portion 136 of valve housing 78 passes, the housing being threaded into structure 54 as stated hereinbefore. Also disposed within passageway 142 is a compression spring 146 which engages cover 134 to keep it in whatever position it is manually set by the operator and to insure cover 134 tightly covers opening 132 when necessary. A set 148 is provided within opening 142 upon which spring 146 sits.

The interior of cover 138 is also provided with a circular inset indicated at 150. The shape of inset 150 is such that air coming from opening 132 of passageway 118 (when cover 134 is removed therefrom) is directed forwardly through the handle 10. The upper portion of structure 54 is provided with an upwardly curved channel as indicated at 152 in FIGS. 1–4 to direct the forwardly moving air around solder collection chamber 28 through the annular passageway indicated at 154 in FIGS. 1 and 7. Thus, in accordance with an important aspect of the invention, the output air from nozzle portion 130 of passageway 118 of structure 54 is employed to cool solder collection chamber 28 and thus handle 10 whereby the device may be continuously used in the vacuum mode of operation without causing discomfort to the operator. This mode of operation particularly tends to heat the handle 10 since the solder and air drawn through tube 26 attains high temperatures. The temperature of the air blown through opening 132 is substantially lower than the temperature present at the output of tube 26 into chamber 28 due to the nozzle effect provided by portion 130 of passageway 118 although a nozzle effect need not necessarily be employed in certain applications. Thus, heat is efficiently removed from solder collection chamber 28 by the air passing through annular passageway 154. This air is then expelled through annular opening 21 disposed in the forward end of handle 10. Curved trigger member 96 may also act as a heat sink for chamber 28.

In operation, assuming solder is to be melted preparatory to the removal thereof, the operator places handle portion 140 over indicia P of FIG. 5 whereby cover 134 is placed in the position shown in FIG. 4. Next, the operator places the tip of tube 26 adjacent the solder to be melted. Trigger 98 is then depressed whereby a hot jet of air is immediately applied to the solder due to the presence of ball valve 68 at the solder removal device. In particular, the actuation of trigger 98 moves trigger member 96 rearwardly to the position shown in FIG. 1 whereby ball valve 68 is removed from opening 70 due to the connecting linkage between trigger member 96 and ball valve 64, the valve being shown in its open position in FIG. 1. Thus, air under pressure passes through opening 70, passageway 80 and opening 116 into passageway 118 in the upper portion of structure 54.

Due to the inset 135 in cover 134, the air in passageway 118 is only partially blocked by the cover. The size of inset 135 is such that air is blown through passageway 48 and out openings 42 and 44. It then passes through solder collection chamber 28 and tube 26. The velocity is slow enough that the air is significantly heated by heater 22 and thus the temperature of the air is sufficient to melt the solder adjacent the tip of tube 26.

The solder having been melted, the operator can now switch to the vacuum mode of operation indicated by the letter V in FIG. 5 whereby cover 134 is placed in the position shown in FIG. 2. Since cover 134 is completely removed from opening 132, the air discharges completely through the opening whereby a vacuum is established in passageway 48 and thus in tube 26 to effect removal of the solder into collection chamber 28. As stated hereinbefore, the air and solder sucked into tube 28 is quite hot and tends to heat the handle 10 to a temperature level which is uncomfortable for the operator's hand, particularly when the device is used continuously for an extended period of time in the vacuum mode. The heat generated in collection chamber 28 is removed by the air discharged from opening 132. This air can be quite cool since portion 130 of passageway 118 is shaped as a nozzle thereby permitting the air to expand as it passes through opening 132. This cool air is directed around curved inset 150 of end cover 138 and thence through curved channel 152 into the annular opening 154 surrounding chamber 28. The heat generated in the chamber is removed by this air which is expelled through annular opening 21 in the front of the device.

If desired, the operator may then blow away loose bits of solder by shifting handle 140 over indicia I of FIG. 5 as shown in FIG. 3. Air under pressure is again directed to passageway 118 as described above when trigger 98 is actuated. As can be appreciated in FIG. 3, opening 132 is completely blocked by cover 134 whereby the air is thus directed through passageway 48, solder collection chamber 28, and thence tube 26 so that a high intensity jet is provided for removal of the loose bits of solder.

The trigger 98 and its associated valving structure including trigger member 96, valve adjust member 82, rod 72, ball valve 68 and spring 66 are not necessary in certain applications and may be dispensed with if desired. Valving of the air under pressure in tube 56 would then occur at some point removed from handle 10 such as at the source 58 of air pressure. Further, if the three modes of operation are not needed for certain applications, cover 134 and spring 146 may also be dispensed with as long as means are provided for guiding the cool air from passageway 118 around solder collection chamber 28 to thereby effect heat removal therefrom.

Thus, in summary, there is disclosed a solder removal device comprising a hollow handle 10 having an opening 21 disposed therein; means 58 for applying air under pressure to the handle; a Venturi means 54 disposed with the handle, the Venturi means having a first opening 116 for receiving the air under pressure, a second opening 48 and a third opening 132; a solder collection chamber 28 disposed within the handle and connected to the second opening of said Venturi means; tubular means 26 extending outside of the handle and connected to the solder collection chamber; and means (150, 152, 154) for directing air discharged from the third opening of Venturi means past the solder collection chamber and out the opening in the handle to thereby remove heat from the chamber generated by hot air and solder sucked through the tubular means. The third opening of the Venturi means is nozzle shaped 130 so that the air discharged therefrom expands to lower the temperature of the discharge air and thus improve said removal of the heat from said solder collection chamber.

A cover means 134 for removably covering the third opening of the Venturi means is provided, the cover means being movable to (a) a first position removed from the third opening whereby a vacuum is established in the tubular means and (b) a second position where the cover means completely covers said third opening whereby a high intensity jet of air is established in said tubular means suitable for removing bits of solder and the like. Heating means 22 are disposed adjacent the tubular means. The cover means has an opening 135 therein, the cover means being movable to a third position where the cover means partially covers the third opening of the Venturi means so that a jet of air is established in the tubular means, the velocity of the jet being slow enough that it can be heated by the heating means to a temperature sufficient to melt solder or the like disposed adjacent the output end of the tubular means.

A trigger 98 disposed on said handle is also provided as are means (64, 66, 72, 94, 96) responsive to the trigger which are disposed at the handle for connecting the first opening of the Venturi means to the means for applying air under pressure to the handle so that an operator can establish a vacuum in the tubular means upon actuation of the trigger. Further, the tubular means, the solder collection chamber, and the Venturi means are collinearly disposed.

What is claimed is:

1. A solder removal device comprising
a hollow handle having an opening disposed therein;
means for applying air under pressure to said handle;
a Venturi means disposed within said handle, said Venturi means having a first opening for receiving said air under pressure, a second opening and a third opening;
a solder collection chamber disposed substantially entirely within said handle and connected to said second opening of said Venturi means, said solder collection chamber tending to heat said handle due to hot air and solder sucked therein thereby rendering it difficult for an operator to hold the handle;
tubular means extending outside of said handle and in communication with said solder collection chamber; and
means for directing air discharged from said third opening of said Venturi means past said solder collection chamber through said hollow handle and out said opening in the handle to thereby remove heat from said solder collection chamber generated by said hot air and solder sucked through said tubular means so that said tendency for the handle to heat is substantially lessened.

2. A device as in claim 1 where said third opening of said Venturi means is nozzle-shaped so that said air discharged therefrom expands to lower the temperature of the discharged air and thus improve said removal of said heat from said solder collection chamber.

3. A device as in claim 1 including cover means for removably covering said third opening of said Venturi means, said cover means being movable to (a) a first position removed from said third opening whereby a vacuum is established in said tubular means and (b) a second position where said cover means completely covers said third opening whereby a high intensity jet of air is established in said tubular means suitable for removing bits of solder and the like.

4. A device as in claim 3 including heating means disposed adjacent said tubular means and where said cover means has an opening therein, said cover means being movable to a third position where said cover means partially covers said third opening of the Venturi means so that a jet of air is established in said tubular means, the velocity of said jet being slow enough that it can be heated by said heating means to a temperature sufficient to melt solder or the like disposed adjacent the output end of said tubular means.

5. A device as in claim 1 including
a trigger disposed on said handle; and
means responsive to said trigger disposed within said handle for connecting said first opening of said Venturi means to said means for applying air under pressure to said handle so that an operator can establish a vacuum in said tubular means upon actuation of said trigger.

6. A device as in claim 1 where said tubular means, said solder collection chamber, and said Venturi means are collinearly disposed.

7. A solder removal device comprising
a hollow handle having an opening disposed therein;
means for applying air under pressure to said handle;
a Venturi means disposed with said handle, said Venturi means having a first opening for receiving said air under pressure, a second opening and a third opening;
a solder collection chamber disposed within said handle and connected to said second opening of said Venturi means;
tubular means extending outside of said handle and connected to said solder collection chamber;
cover means for removably covering said third opening of said Venturi means, said cover means being movable to (a) a first position removed from said third opening whereby a vacuum is established in said tubular means and (b) a second position where said cover means completely covers said third opening whereby a high intensity jet of air is established in said tubular means suitable for removing bits of solder and the like and
heating means disposed adjacent said tubular means and where said cover means has an opening therein, said cover means being movable to a third position where said cover means partially covers said third opening of the Venturi means so that a jet of air is established in said tubular means, the velocity of said jet being slow enough that it can be heated by said heating means to a temperature sufficient to melt solder or the like disposed adjacent the output end of said tubular means.

* * * * *